UNITED STATES PATENT OFFICE.

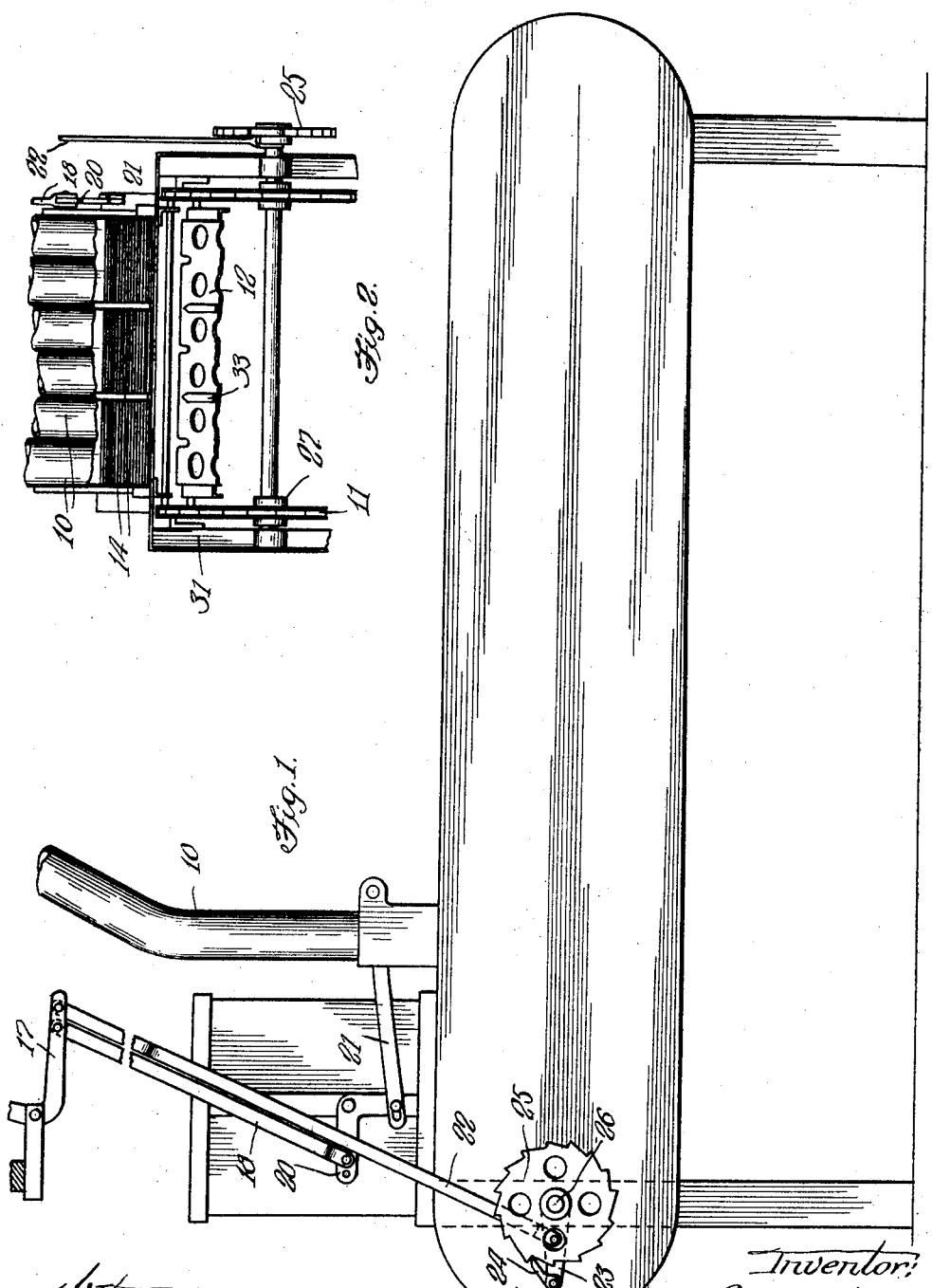

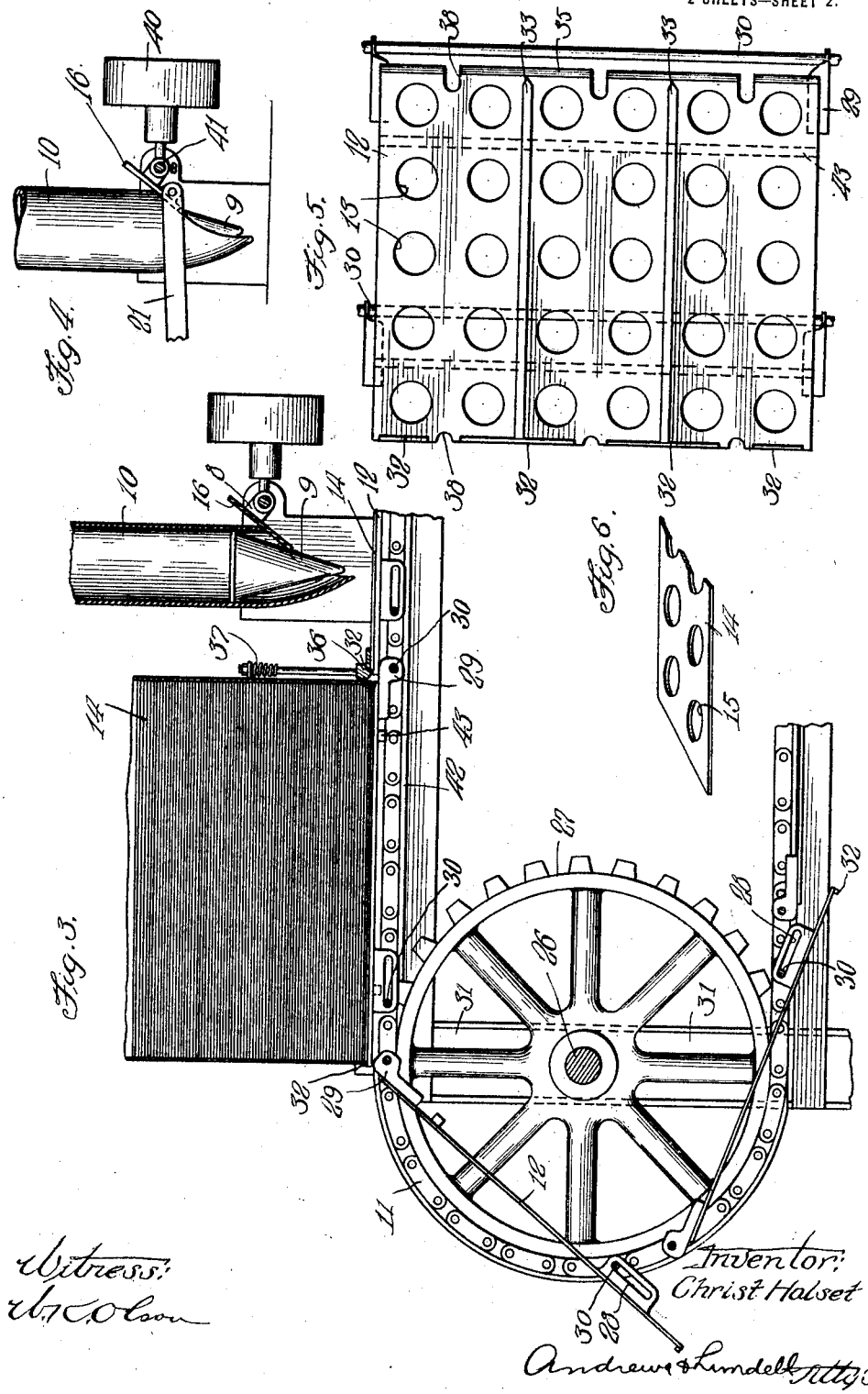

CHRIST HALSET, OF CHICAGO, ILLINOIS, ASSIGNOR TO CONSOLIDATED WAFER COMPANY, OF CHICAGO, ILLINOIS, A CORPORATION OF NEW YORK.

ICE-CREAM-CONE MACHINE.

1,384,461.   Specification of Letters Patent.   Patented July 12, 1921.

Application filed January 9, 1920. Serial No. 350,309.

*To all whom it may concern:*

Be it known that I, CHRIST HALSET, a subject of Norway, residing at Chicago, in the county of Cook and State of Illinois, have invented certain new and useful Improvements in Ice-Cream-Cone Machines, of which the following is a specification.

This invention relates to ice-cream cone machinery, and particularly to mechanism for crating the ice-cream cones preparatory to packing them after they have been delivered by the ice-cream cone molding and baking machine; and the mechanism thus forms an attachment to be used with such machines. The crating mechanism may be applied to any ordinary form of ice-cream cone molding and baking machines such as the machine illustrated and described in the Patent No. 1122913, issued to J. P. Groset, December 29, 1914. Inasmuch as the molding and baking machine itself is not a part of my invention, such machine is not shown herein, but reference may be had to said patent, or to any ordinary type of ice-cream cone making machines for further information relating thereto.

The object of the invention is to provide mechanism for receiving the cones from the baking machine, and to form the cones into groups for the purpose of placing them properly into cartons for commercial distribution. A further object of the mechanism is to provide means for transferring the cones from the baking machine to the cartons in such a manner that they are not handled at all by the operators. Other objects of the invention will be apparent upon a consideration of the accompanying drawings and the following description thereof.

Of the drawings Figure 1 is an elevation of the crating mechanism, which embodies features of my invention. Fig. 2 is an end view, partly broken away, of the mechanism. Fig. 3 is an enlarged fragmental sectional view of a portion of the mechanism. Fig. 4 is an elevation of a portion of the mechanism. Fig. 5 is a plan view of a portion of the transferring mechanism; and Fig. 6 is a detail fragmental view of a card-board used for holding the cones.

It is common practice to provide with ice-cream cone molding and baking machines vertical pipes or conduits into which the finished cones are delivered by the machine. The cones are delivered in groups usually of six or more cones according to the arrangement of the particular machine, all of the cones in one group being delivered simultaneously into a series of conduits corresponding in number to the number of cones. In this particular instance the machine to which my mechanism is applied delivers six cones 9 into the six conduits 10. As is well understood the cones when delivered by the baking machine are entirely finished and ready to be nested and packed for shipping. It is the purpose of my invention to receive these cones from the conduits 10 and put them in proper shape for packing.

In general my invention consists in receiving the cones 9 from the conduits 10 upon a chain belt carrier, such as the carrier 11, which supports sheets of metal 12 having suitable openings 13 therein for receiving the cones from the conduits 10. But before the cones are received by the sheets or crates 12 a set of card-board sheets 14 are placed upon the sheets 12, and openings 15 in the card-boards are made to register with the openings 13, and the cones are passed into the openings 15 of the card-board as well as the openings 13 of the supporting sheets. When the sheets are filled with cones, they are transmitted, step by step, by the chain belt to a suitable point and the card-boards containing the cones are removed by the operators from the carrier, the operators being careful to lift the cones by by the card-boards so as not to touch the cones, and the card-boards with the cones are packed in suitable packing boxes or cartons for shipment.

As to the details of the mechanism a valve 16 is pivoted, by an arm 8, adjacent the lower end of each of the conduits 10 and is arranged so as to close a portion of the lower end of the conduit, as indicated in Fig. 4, so as to prevent the cones from passing out of the conduits until the proper time. Any suitable driving mechanism may be used for operating the various devices. Ordinarily the driving mechanism of the baking machine itself is used, and in this instance I use a lever 17 which is rocked by the mechanism of the baking machine at the proper time to suitably operate the valves 16 and the transmitting mechanism. The lever 17, by a suitable link 18, operates a lever 20, which, in turn, by a link 21 pivoted to the valve 16, operates, at the proper time, the valve, so as to allow the cones to pass out of the conduits into the receiving cardboards.

The chain belt 11 is used for transmitting the cones, and it is operated, in this instance, also by the lever 17 by means of a connecting link 22 which operates the pawl arm 23 so that, at suitable times, the pawl 24 gives a step by step rotation to the ratchet wheel 25 and the shaft 26. Upon the shaft 26 are mounted the sprocket wheels 27 which support and operate the chain belt. In this manner the chain belt is suitably operated step by step so as to be at rest when the cones are received and to transmit the cones after their reception wherever desired. The supporting sheets 12 of the transmitting mechanism are connected to the chain belt by means of blocks 29 fixed to the sheets, the rear blocks having slots 28, and the front blocks having holes through which pass rods 30, fixed to the links of the belt, while other similar rods 30 pass through the slots 28, the length of the sheets 12 being such that they pass between the two supporting wheels 27 as indicated in Fig. 3, and the slots 28 allowing the belt to follow the periphery of the wheels, while the sheets cut across.

Mounted upon the framework 31 of the mechanism are piles of card-boards 14. In this instance I prefer to use three piles of card-boards, the width of the boards being such that three boards will be substantially the same width as the length of the supporting sheets 12. As these sheets 12 are transmitted by the chain belt they pass under the piles of card-board, and flanges 32 at the rear end of the sheets catch on the rear edges of the lower card-boards and slip the three bottom boards out from under the piles. Strips 33 extending across the upper surface of the sheets 12 pass between the piles of card-board and hold the card-boards, which are pulled out by the moving sheets, in their proper places so that the openings 15 of the card-boards, register with the openings 13 of the sheets. The front edges 35 of the sheets 12 are rounded downwardly so as to prevent these edges from catching on the card-boards; and a member 36, positioned in front of each pile of card-boards and pressed downwardly by means of a spring 37, prevents more than the one cardboard from being drawn out from each pile by the flanges 32 of the sheets. The members 36 are short enough to pass between the flanges 32, so that if no card-board is pulled out they will not strike the flanges.

As the sheets with the card-boards thereon move forwardly, and the openings 15 and 13 come directly under the lower end of the conduits 10, the transmitting belt comes to rest; the valve 16 is opened, and the cones drop into the openings.

The valve 16 is then closed by the movement of the lever 17, a new group of cones is deposited in the conduits, the belt is moved forwardly another step, and the process is repeated. When the card-boards are filled with cones and have been transmitted to the removing position, the operator removes the card-boards from the supporting sheets by passing her fingers under the card-board into the recesses 38 of the sheets 12, and then places the card-boards and cones into the proper packing receptacle.

A weight 40 is fixed to the shaft 41 so as to hold the valve 16 closed against the pressure of the cones, it being understood that the valve 16 is also fixed to the shaft 41, the shaft being rocked by the link 21. The sheets 12 are supported by means of L beams 42 upon which slide the blocks 29; and stiffening strips 43 are fixed to the underside of the sheets 12. Any suitable number of cones may be placed in each card-board. I prefer to place five in a row; and hence five teeth of the ratchet wheel 25 are required to fill each card-board. As the space between the openings of adjacent card-boards may be somewhat greater than the space between openings on the same card-board, I provide every fifth tooth on the wheel 25 sufficiently longer than the other teeth to properly register the forward openings of the card-boards with the conduits.

Although I have described my invention as applied to the crating of ice-cream cones it is to be understood that the mechanism may be used for handling various other articles such as fragile articles which should be packed carefully in order to avoid breakage or other injury, such as tumblers, eggs and the like; or articles which it is desired to have handled as little as possible during the process of manufacturing and packing, such as various articles of food. And it is to be understood that although I have described with some particularity the details of the mechanism as used for handling ice-cream cones, yet it is to be understood that modifications therein may be made by those skilled in the art without departing from the spirit of my invention as disclosed by the following claims, not only for use with ice-cream cones, but also for use in handling various other articles.

I claim as my invention:

1. Ice-cream cone crating means comprising a cardboard sheet, said sheet having a plurality of openings therein adapted to receive ice-cream cones, and means for receiving ice-cream cones from a cone manufacturing machine and for passing an ice-cream cone into each of said openings.

2. Ice-cream cone crating means comprising a sheet, said sheet having a plurality of openings therein adapted to receive ice-cream cones, and means for receiving ice-cream cones from a cone manufacturing machine and for passing an ice-cream cone into each of said openings, said receiving means comprising a plurality of substantially parallel but non-horizontal conduits.

3. Ice-cream cone crating means comprising a sheet, said sheet having a plurality of openings therein adapted to receive ice-cream cones, and means for receiving ice-cream cones from a cone manufacturing machine and for passing an ice-cream cone into each of said openings, said receiving means comprising a plurality of substantially parallel but non-horizontal conduits, said conduits being spaced apart substantially the same distance as the distance between the openings in said sheet.

4. Ice-cream cone crating means comprising a sheet, said sheet having a plurality of openings therein adapted to receive ice-cream cones, and means for receiving ice-cream cones from a cone manufacturing machine and for passing an ice-cream cone into each of said openings, said receiving means comprising a plurality of substantially parallel but non-horizontal conduits, said conduits being spaced apart substantially the same distance as the distance between the openings in said sheet, and means for alternately opening and closing the lower end of said conduits.

5. An ice-cream cone crater comprising a plurality of non-horizontal conduits for receiving cones, movable means for preventing the cones from passing out of said conduits, sheets having openings therein for receiving cones, means for passing said sheets under the the ends of said conduits, and means for operating said latter means and said movable means.

6. Ice-cream cone crating mechanism comprising transmitting means, said transmitting means having sheets thereon, said sheets having a plurality of openings therethrough, a plurality of card-boards, said card-boards having openings therethrough, means for placing said card-boards on said sheets so that the openings in the card-boards register with the openings in the sheets, and means for passing ice-cream cones into each of said pairs of registering openings.

7. In an ice-cream cone crating and transmitting machine mechanism, transmitting means, supporting sheets fixed to said transmitting means, piles of card-boards, said card-boards being mounted over said transmitting means, and means for placing said card-boards on said supporting sheets, said supporting sheets and card-boards having openings therethrough arranged to register when said card-boards are placed on said sheets, cone receiving mechanism mounted over said transmitting means and adapted to deliver cones into said registering holes.

In testimony whereof, I hereunto set my hand.

CHRIST HALSET.